United States Patent
Sugio

(10) Patent No.: US 8,811,669 B2
(45) Date of Patent: Aug. 19, 2014

(54) OBJECT TRACKING DEVICE

(75) Inventor: Junichi Sugio, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 200 days.

(21) Appl. No.: 13/555,824

(22) Filed: Jul. 23, 2012

(65) Prior Publication Data

US 2013/0058525 A1 Mar. 7, 2013

(30) Foreign Application Priority Data

Sep. 1, 2011 (JP) .................. 2011-190583

(51) Int. Cl.
*G06K 9/00* (2006.01)
(52) U.S. Cl.
CPC ... *G06K 9/00261* (2013.01); *G06T 2207/30201* (2013.01); *G06T 2207/10016* (2013.01)
USPC .......................................... 382/103; 382/106
(58) Field of Classification Search
CPC .................. G06K 9/00261; G06T 2207/10016; G06T 2207/30241; G06T 7/204
USPC .......... 382/100, 103–107; 345/156–158, 204, 345/419, 633; 707/687, 705, 690, 769, 707/770–771; 705/14, 58; 713/400; 715/799, 863; 348/154, 164
See application file for complete search history.

(56) References Cited

U.S. PATENT DOCUMENTS

| | | | | |
|---|---|---|---|---|
| 8,639,000 | B2 * | 1/2014 | Zhao et al. ................. | 382/128 |
| 2012/0237095 | A1 * | 9/2012 | Zhao et al. ................. | 382/128 |
| 2012/0300990 | A1 * | 11/2012 | Hanna et al. ................ | 382/117 |
| 2013/0170754 | A1 * | 7/2013 | Tsukizawa et al. ......... | 382/195 |

FOREIGN PATENT DOCUMENTS

| JP | 2001-243476 A | 9/2001 |
|---|---|---|
| JP | 2008-287648 A | 11/2008 |

* cited by examiner

*Primary Examiner* — Hadi Akhavannik
*Assistant Examiner* — Mehdi Rashidian
(74) *Attorney, Agent, or Firm* — McDermott Will & Emery LLP

(57) ABSTRACT

In an object tracking device, a search region setting unit sets the search region of an object in a frame image at a present point in time, based on an object region in a frame image at a previous point in time, zoom center coordinates in the frame image at the previous point in time, and a ratio between the zoom scaling factor of the frame image at the previous point in time and the zoom scaling factor of the frame image at the present point in time. A normalizing unit normalizes the image of a search region of the object included in the frame image at the present point in time to a fixed size. A matching unit searches the normalized mage of the search region for an object region similar to a template image.

6 Claims, 11 Drawing Sheets

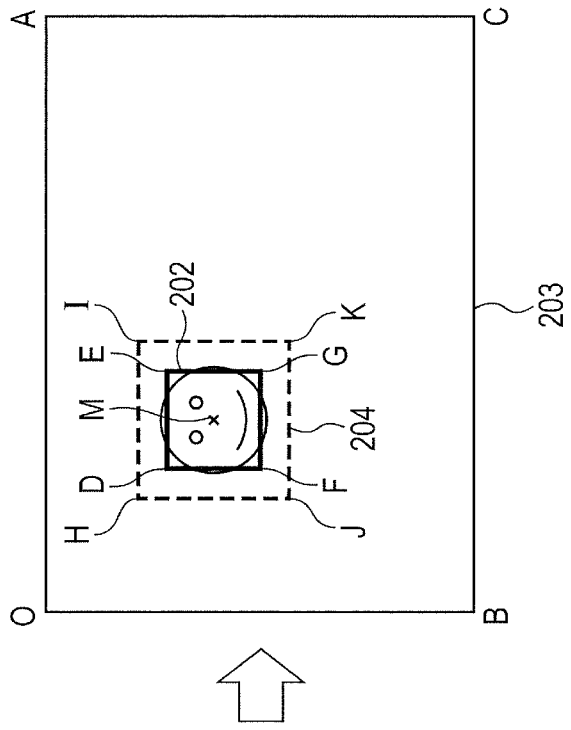
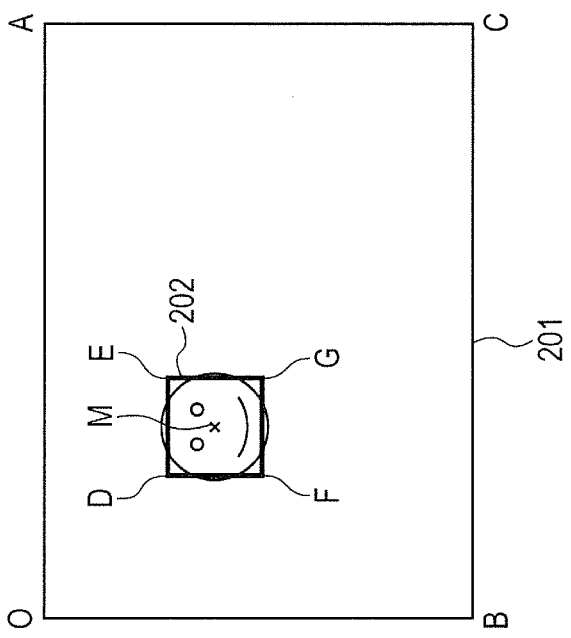

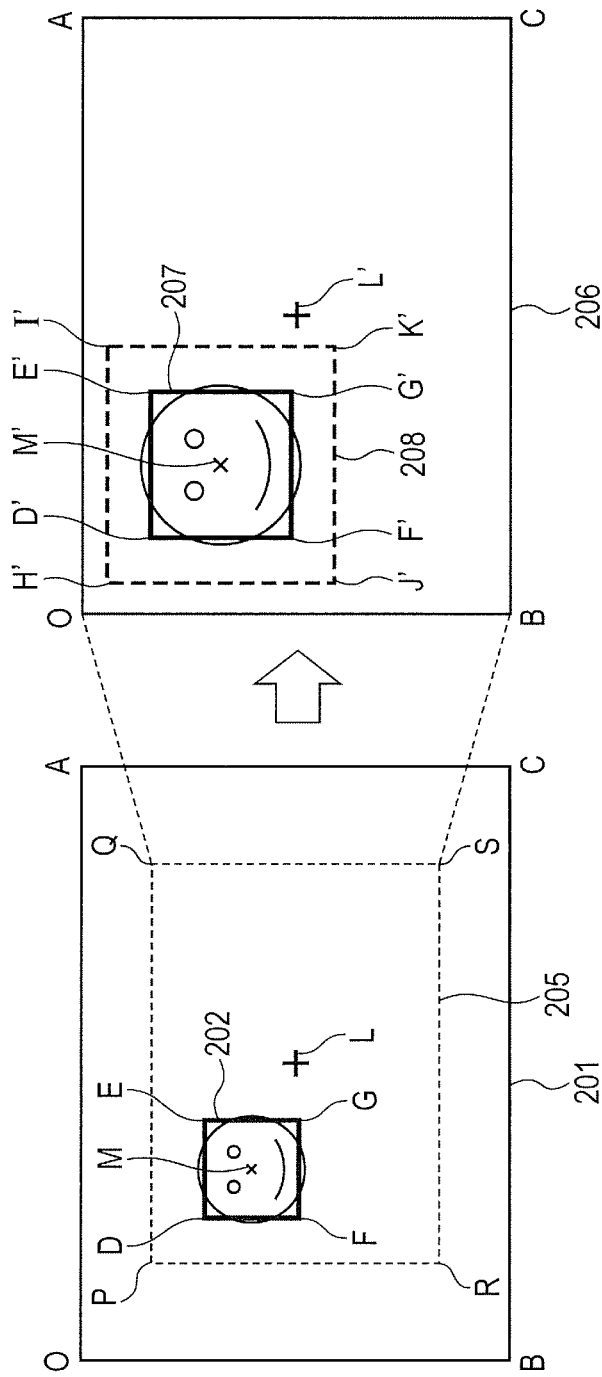

OBJECT TRACKING DEVICE

CROSS-REFERENCE TO RELATED APPLICATIONS

The disclosure of Japanese Patent Application No. 2011-190583 filed on Sep. 1, 2011 including the specification, drawings and abstract is incorporated herein by reference in its entirety.

BACKGROUND

The present invention relates to an object tracking device.

In optical camera equipped devices in these years, an object such as a face image registered beforehand is tracked to output location information about the object for use in the purpose of autofocus or the like.

In the case where object size is changed because of a change in camera zooming, techniques that allow the tracking of an object are disclosed in Japanese Patent Application Laid-Open Publication No. 2008-287648 and Japanese Patent Application Laid-Open Publication No. 2001-243476.

In Japanese Patent Application Laid-Open Publication No. 2008-287648, in order to track an object changing in the size, a taken image is matched with a plurality of template images that a template image to be a reference is scaled up or scaled down to modify the scaling factor.

In Japanese Patent Application Laid-Open Publication No. 2001-243476, a template image is selected from a plurality of template images that a template image to be a reference is scaled up or scaled down according to a zoom scaling factor for matching the selected template image with a taken image.

SUMMARY

However, Japanese Patent Application Laid-Open Publication No. 2008-287648 has a problem in that it is necessary to make matching with the template images in order to meet the tracking of the object changing in the size, causing an increase in a processing load.

In Japanese Patent Application Laid-Open Publication No. 2001-243476, although it is possible to increase speed more than in Japanese Patent Application Laid-Open Publication No. 2008-287648 because a camera image is matched with a single template image according to a zoom scaling factor, it is necessary to create and store template images at a plurality of scaling factors. Moreover, in the case where a taken image is scaled up by zooming, it takes time for matching because a template image with the number of pixels increased is used.

Therefore, it is an object of the present invention to provide an object tracking device that can highly accurately track a target object at high speed even though the size of the target object is changed by zooming.

An object tracking device according to an embodiment of the present invention is an object tracking device that tracks an object included in a frame image, the object tracking device including: a storage unit configured to store a template image of an object to be a track target; an image input unit configured to receive a frame image in a time series; a search region setting unit configured to set a search region of the object in a frame image at a present point in time, when a zoom scaling factor of the frame image at the present point in time is different from a zoom scaling factor of a frame image at a previous point in time, based on an object region in the frame image at the previous point in time, zoom center coordinates in the frame image at the previous point in time, and a ratio between the zoom scaling factor of the frame image at the previous point in time and the zoom scaling factor of the frame image at the present point in time; a normalizing unit configured to normalize an image of the search region of the object included in the frame image at the present point in time to a fixed size; and a matching unit configured to search the normalized image of the search region for an object region similar to the template image.

According to an embodiment of the present invention, it is possible to highly accurately track a target object at high speed even though the size of the target object is changed by zooming.

BRIEF DESCRIPTION OF THE DRAWINGS

The present invention will become fully understood from the detailed description given hereinafter and the accompanying drawings, in which:

FIGS. 3A and 3B are diagrams illustrative of the search region of a frame image at a present point in time in the case where the zoom scaling factor of the frame image at the present point in time is the same as the zoom scaling factor of a frame image at a previous point in time;

FIGS. 4A and 4B are diagrams illustrative of the search region of a frame image at a present point in time in the case where the zoom scaling factor of the frame image at the present point in time is different from the zoom scaling factor of a frame image at a previous point in time;

DETAILED DESCRIPTION

In the following, embodiments of the present invention will be described with reference to the drawings.

First Embodiment

1. Digital Still Camera

Figure 1:
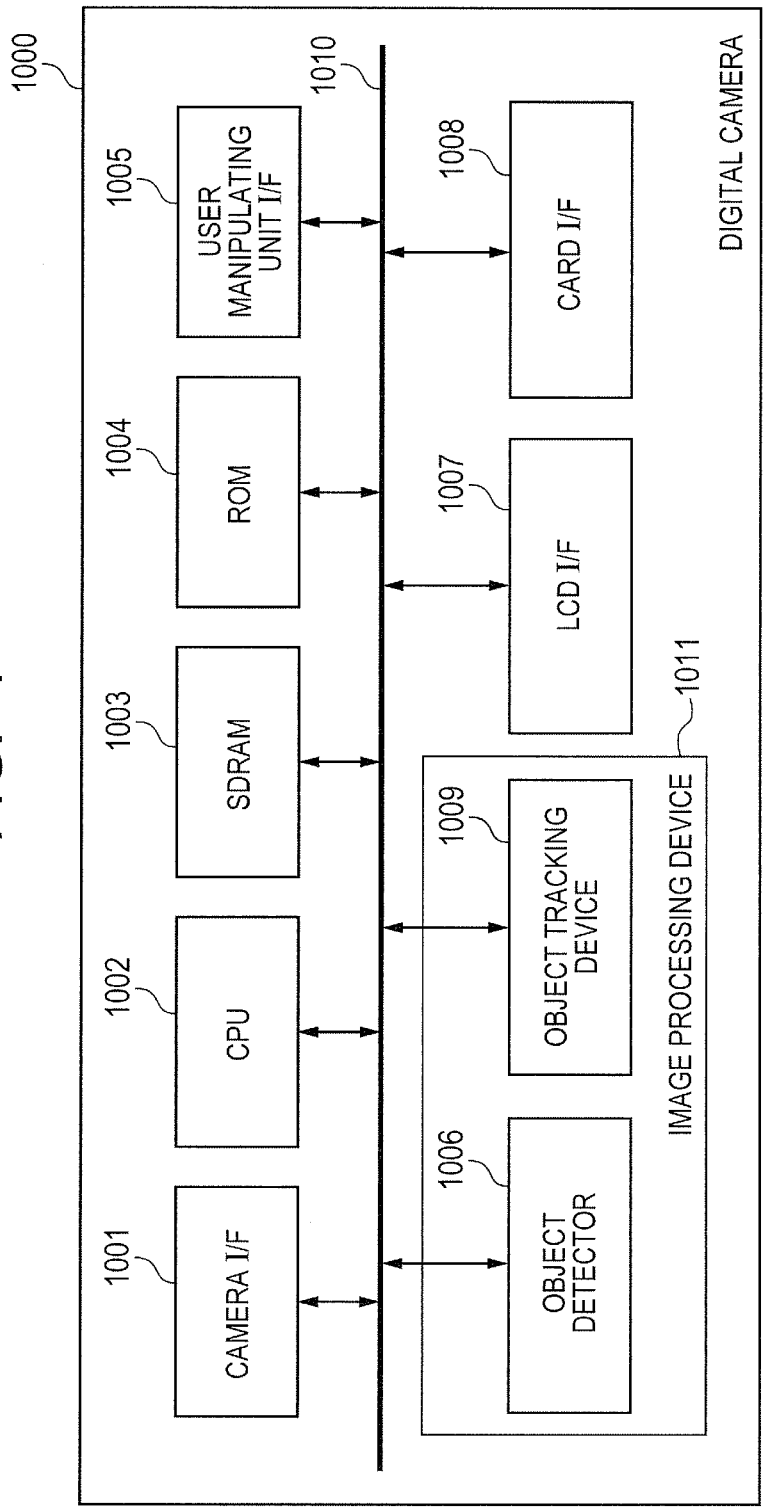
FIG. 1 is a block diagram illustrating an exemplary configuration of a digital camera according to an embodiment of the present invention.

FIG. 1 is a block diagram illustrating an exemplary configuration of a digital camera according to an embodiment of the present invention. In the embodiment of the present invention, a face is taken and described as an example of an object to be detected and tracked. However, a method according to the embodiment of the present invention is not limited to a face, and the method can be used for detecting and tracking other objects.

Referring to FIG. 1, this digital camera has semiconductor devices. The semiconductor devices include a camera I/F (Interface) 1001, a CPU (Central Processing Unit) 1002, an SDRAM (Synchronous Dynamic Random Access Memory) 1003, a ROM (Read Only Memory) 1004, a user manipulating unit I/F 1005, an LCD I/F 1007, a card I/F 1008, an object detector 1006, and an object tracking device 1009. These components are coupled to each other through a bus 1010. The object detector 1006 and the object tracking device 1009 form an image processing device 1011.

The camera I/F 1001 is coupled to a camera sensor, in which the camera I/F 1001 receives an image taken by the camera sensor and writes the image on an SD memory card or the like, not shown, coupled through the SDRAM 1003 or the card I/F 1008.

The CPU 1002 executes programs stored in the SDRAM 1003 or the ROM 1004 to control the overall system. The CPU 1002 sends information expressing the position of a face (an object) stored in the SDRAM 1003 to the imaging system of the camera from the camera I/F 1001 for focusing. Moreover, the CPU 1002 sends a graphic form (a rectangle or the like) expressing the position of the face to the LCD I/F 1007 from information expressing the position of the face (the object) sent from the object detector 1006 and the object tracking device 1009.

The ROM 1004 stores data used for detecting the object and tracking the object.

The user manipulating unit I/F 1005 is coupled to a shutter button or the like, not shown. When the shutter button is pressed, the user manipulating unit I/F 1005 notifies the CPU 1002 by an interrupt or the like that the shutter button is pressed. When the CPU 1002 receives an interrupt request, the CPU 1002 controls the camera I/F 1001 to store an image taken by the camera sensor in the SDRAM 1003 or the like. Moreover, in the case where a user manipulates a zoom switch or the like, not shown, to change a zoom scaling factor, the zoom scaling factor is sent to the CPU 1002 through the user manipulating unit I/F 1005.

The LCD I/F 1007 is coupled to an LCD panel, not shown, to control display on the LCD, for example. The LCD I/F 1007 displays the image taken by the camera sensor on the LCD as a preview. Furthermore, the LCD I/F 1007 superimposes the graphic form expressing the position of the face (the object) sent from the CPU 1002 on the taken image.

The card I/F 1008 is coupled to an external recording medium such as an SD memory card to read data from and write data on the recording medium.

The object detector 1006 detects the face (the object) from the image taken by the camera sensor and inputted from the camera I/F 1001, and stores information expressing the position of the face (the object) in the SDRAM 1003. The object detector 1006 registers the region of the detected object as a template.

The object tracking device 1009 tracks the face (the object) detected at the object detector 1006 in the image taken by the camera sensor and inputted from the camera I/F 1001, and stores information expressing the position of the face (the object) in the SDRAM 1003. The object tracking device 1009 searches the taken image for a region similar to the template obtained at the object detector for tracking the object. The object tracking device 1009 receives a search area scaling factor K, a zoom scaling factor, and zoom center coordinates sent from the CPU 1002. The object tracking device 1009 receives the template image and object region of the object of a track target from the object detector 1006.

2. Configuration

Figure 2:
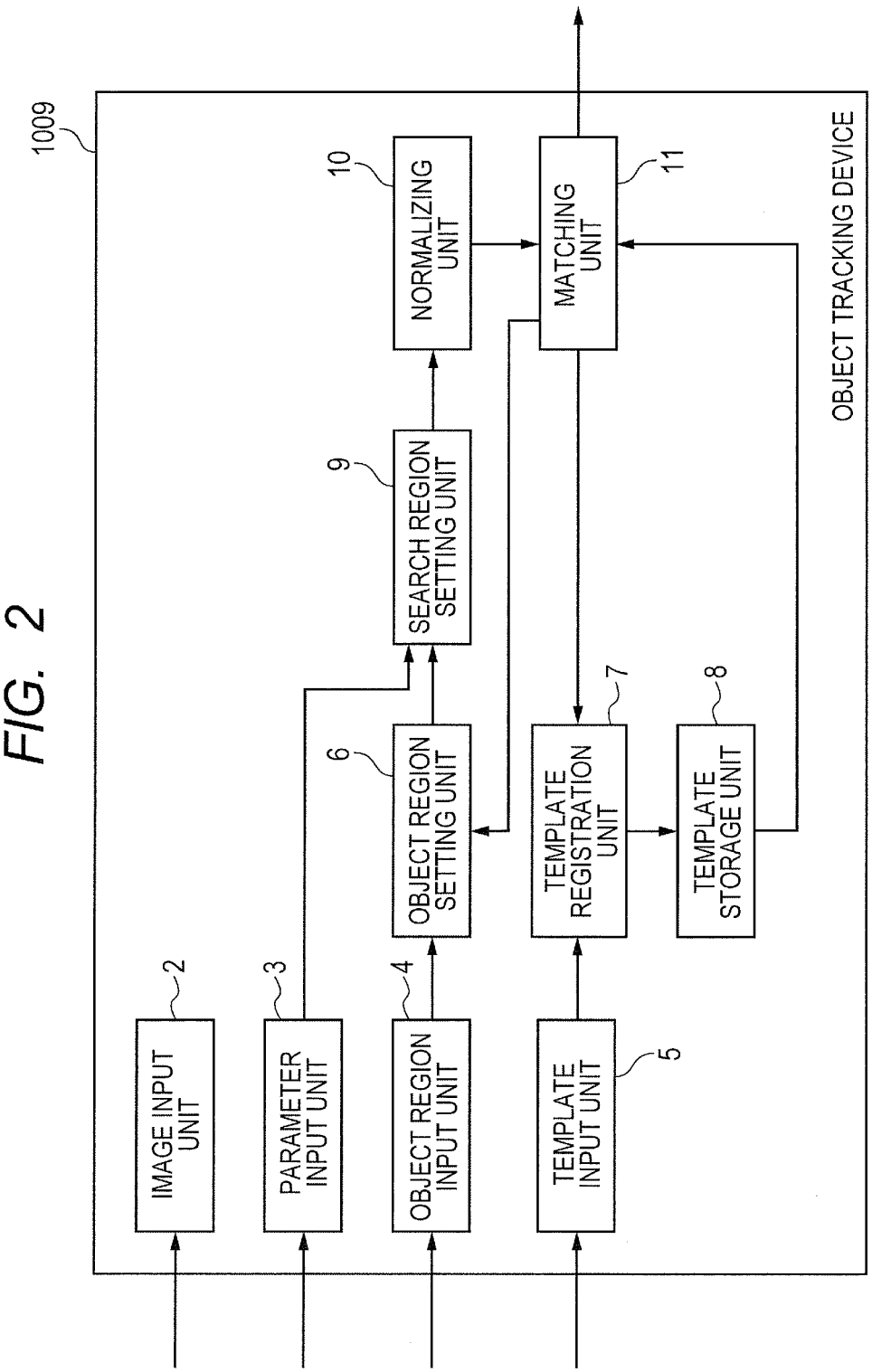
FIG. 2 is a diagram illustrating the configuration of an object tracking device according to a first embodiment.

FIG. 2 is a diagram illustrating the configuration of the object tracking device according to the first embodiment.

Referring to FIG. 2, this object tracking device 1009 includes an image input unit 2, a parameter input unit 3, an object region input unit 4, an object region setting unit 6, a template input unit 5, a template registration unit 7, a template storage unit 8, a search region setting unit 9, a normalizing unit 10, and a matching unit 11.

The image input unit 2 receives a frame image for searching the object to be a track target from the camera I/F 1001 at a predetermined frame rate. In the case where a user zooms (scales up or scales down) a subject, the image input unit 2 receives a zoomed frame image.

The parameter input unit 3 receives the input of the search area scaling factor K from the CPU 1002. Moreover, in the case where the user zooms the subject to cause the zoom scaling factor of a frame image at a present point in time to change from the zoom scaling factor of a frame image at a previous point in time, the parameter input unit 3 receives a zoom scaling factor and zoom center coordinates from the CPU 1002.

The template input unit 5 receives the template image of the object of a track target outputted from the object detector.

The template storage unit 8 stores the template image of the object of a track target. The template registration unit 7 stores the template image inputted to the template input unit 5 as an initial template in the template storage unit 8. The template registration unit 7 updates the template image in the template storage unit 8 with the image of an object region determined at the matching unit 11.

The object region input unit 4 receives information expressing the object region to be a track target from the object detector.

The object region setting unit 6 sets the object region inputted to the object region input unit 4 to an initial object region. The object region setting unit 6 sets, to a new object region, an object region searched at the matching unit 11 as the object region is similar to the template image.

In the case where the zoom scaling factor of the frame image at the present point in time is the same as the zoom scaling factor of the frame image at the previous point in time, the search region setting unit 9 sets a region (a reference region) including an object region in the frame image at the previous point in time and larger than the object region by the search area scaling factor K to an object region in the frame image at the present point in time.

In the case where the zoom scaling factor of the frame image at the present point in time is different from the zoom scaling factor of the frame image at the previous point in time, the search region setting unit 9 finds the reference region, and sets a region where the reference region is zoomed (scaled up or scaled down) based on the zoom center coordinates in the frame image at the previous point in time and a ratio between the zoom scaling factor of the frame image at the previous point in time and the zoom scaling factor of the frame image at the present point in time to the search region of the object in the frame image at the present point in time.

The normalizing unit 10 normalizes the image of the search region of the object in the frame image at the present point in time to a fixed size to create a normalized search image.

The matching unit 11 searches the normalized search image for a region similar to the template image stored in the template storage unit 8, and in the case where a portion where the similarity is a predetermined value or more is found, the matching unit 11 determines that portion as the object region in the present frame, and outputs information expressing the region to the CPU 1002. Here, for the similarity, the reciprocal of an absolute difference between the pixel values of two images or the cross correlation therebetween, for example, can be used.

In the case where a portion where the similarity is a predetermined value or more is not found, the matching unit 11 instructs the object detector to again detect the object.

3. Examples of Search Region

FIGS. 3A and 3B are diagrams illustrative of the search region of a frame image at a present point in time in the case where the zoom scaling factor of the frame image at the present point in time is the same as the zoom scaling factor of a frame image at a previous point in time.

FIG. 3A is a diagram illustrating a frame image at the previous point in time. In a frame image 201, suppose that coordinates at the upper left are O (0, 0), coordinates at the upper right are A (DX, 0), coordinates at the lower left are B (0, DY), and coordinates at the lower right are C (DX, DY).

The position of an object region 202 detected in the frame at the previous point in time is defined as follows. Center coordinates are at M (X1, Y1), coordinates at the upper left are at D (X1−ax, Y1−ay), coordinates at the upper right are at E (X1+ax, Y1−ay), coordinates at the lower left are F (X1−ax, Y1+ay), and coordinates at the lower right are at G (X1+ax, Y1+ay).

FIG. 3B is a diagram illustrating a frame image at the present point in time. In a frame image 203, as similar to the frame at the previous point in time, coordinates at the upper left are O (0, 0), coordinates at the upper right are A (DX, 0), coordinates at the lower left are B (0, DY), and coordinates at the lower right are C (DX, DY). The position of a search region 204 in the frame image at the present point in time is as follows.

Center coordinates are at M (X1, Y1), coordinates at the upper left are at H (X1−ax', Y1−ay'), coordinates at the upper right are at I (X1+ax', Y1−ay'), coordinates at the lower left are at J (X1−ax', Y1+ay'), and coordinates at the lower right are at K (X1+ax', Y1+ay'). Here, ax'=K×ax and ay'=K×ay. K is the search area scaling factor.

Therefore, in the case where the zoom scaling factor of the frame image at the present point in time is the same as the zoom scaling factor of the frame image at the previous point in time, the search region in the frame at the present point in time is set to a rectangular region (a reference region) 204 where H, I, J, and K are vertexes. This rectangular region 204 is a region including the object region 202 in the frame image at the previous point in time and larger than the object region 202 by K times.

FIGS. 4A and 4B are diagrams illustrative of the search region of a frame image at a present point in time in the case where the zoom scaling factor of the frame image at the present point in time is different from the zoom scaling factor of a frame image at a previous point in time.

FIG. 4A is a diagram illustrating a frame image at the previous point in time. In a frame image 201, suppose that coordinates at the upper left are O (0, 0), coordinates at the upper right are A (DX, 0), coordinates at the lower left are B (0, DY), and coordinates at the lower right are C (DX, DY).

The position of an object region 202 detected in the frame at the previous point in time is defined as follows. Center coordinates are at M (X1, Y1), coordinates at the upper left are at D (X1−ax, Y1−ay), coordinates at the upper right are at E (X1+ax, Y1−ay), coordinates at the lower left are F (X1−ax, Y1+ay), and coordinates at the lower right are at G (X1+ax, Y1+ay).

Here, suppose that a position L (X0, Y0) is zoom center coordinates, a ratio between the zoom scaling factor of the frame image at the previous point in time and the zoom scaling factor of the frame image at the present point in time is ZR, the camera is zoomed to scale up a rectangular region 205 where P, Q, R, S are vertexes in the frame image at the previous point in time to the entire region of the frame image at the present point in time. Here, the position of P is at (X0−EX/2, Y0−EY/2), the position of Q is at (X0+EX/2, Y0−EY/2), the position of R is at (X0−EX/2, Y0+EY/2), and the position of S is at (X0+EX/2, Y0+EY/2). The zoom scaling factor ratio ZR=DX/EX=DY/EY. For example, in the case where the zoom scaling factor of the camera at the previous point in time is 2 and the zoom scaling factor of the camera at the present point in time is 4, the zoom scaling factor ratio ZR is 2 (=4/2). In the case where the zoom scaling factor is increased, that is, the region is scaled up, the zoom scaling factor ratio ZR is larger than 1, whereas in the case where the zoom scaling factor is reduced, that is, the region is scaled down, the zoom scaling factor ratio ZR is smaller than 1.

FIG. 4B is a diagram illustrating a frame image at the present point in time. In a frame image 206, as similar to the frame at the previous point in time, coordinates at the upper left are O (0, 0), coordinates at the upper right are A (DX, 0), coordinates at the lower left are B (0, DY), and coordinates at the lower right are C (DX, DY).

Moreover, a zoom center L at the previous point in time moves to a position L' expressing the center of the camera image, which is the center of the frame image 206.

The object region 202 detected in the frame at the previous point in time is moved and zoomed in a rectangular region 207 where the center is at M' and D', E', F', G' are vertexes. Here, the position of M' is at (XP, YP), where XP=DX/2+ZR×(X1−X0) and YP=DY/2+ZR×(Y1−Y0). The position of D' is at (XP−ax×ZR, YP−ay×ZR), the position of E' is at (XP+ax×ZR, YP−ay×ZR), the position of F' is at (XP−ax×ZR, YP+ay×ZR), and the position of G' is at (XP+ax×ZR, YP+ay×ZR).

The position of a search region 208 is set to a rectangular region 208 where the center is at M' and H', I', J', and K' are vertexes.

Here, the position of M' is at (XP, YP), the position of H' is at (XP−ax'×ZR, YP−ay'×ZR), the position of I' is at (XP+ax'×ZR, YP−ay'×ZR), the position of J' is at (XP−ax'×ZR, YP+ay'×ZR), and the position of K' is at (XP+ax'×ZR, YP+ay'×ZR). Here, ax'=K×ax, ay'=K×ay, and K is the search area scaling factor.

Therefore, in the case where the zoom scaling factor of the frame image at the present point in time is different from the zoom scaling factor of the frame image at the previous point in time, the search region in the frame at the present point in time is set to the rectangular region 208 where H', I', J', and K' are vertexes.

This rectangular region 208 is a region including the region 207 where the object region 202 in the frame image at the previous point in time is zoomed and larger than the object region 207 by K times. Moreover, the rectangular region 208 is a region where the search region in the frame image at the present point in time (the region 204 in FIG. 3B) in the case where the zoom scaling factor of the frame image at the present point in time is the same as the zoom scaling factor of the frame image at the previous point in time is zoomed (scaled up or scaled down) based on the zoom center coordinates L in the frame image at the previous point in time and the zoom scaling factor ratio ZR.

4. Example of Normalization

Figure 5:
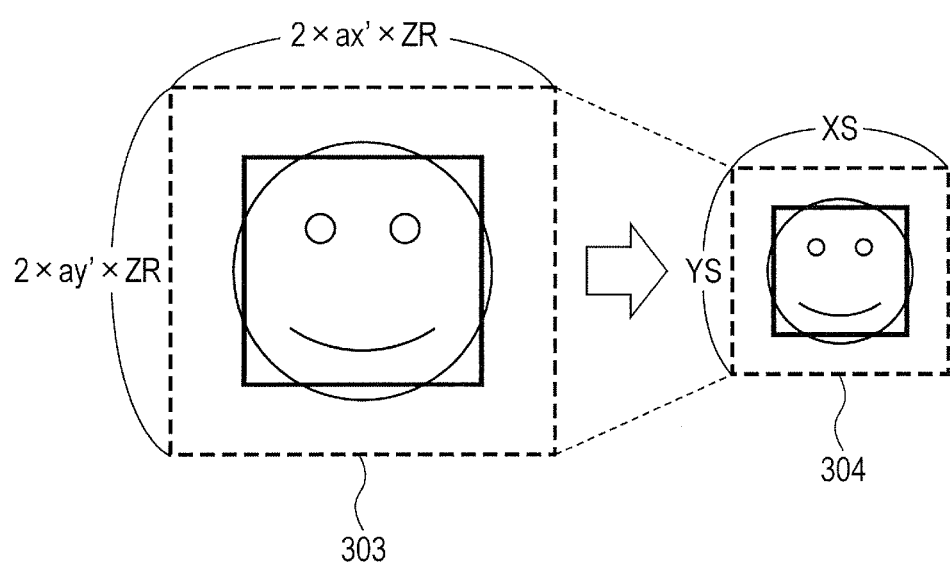
FIG. 5 is a diagram illustrative of an example of normalization.

FIG. 5 is a diagram illustrative of an example of normalization.

In FIG. 5, the normalizing unit 10 extracts the image of a search region 303 from a frame image. As illustrated in FIG. 4B, in the case where the zoom scaling factor of the frame image at the present point in time is different from the zoom scaling factor of the frame image at the previous point in time, the number of pixels of the extracted image in the lateral direction is 2×ax'×ZR, and the number of pixels in the vertical direction is 2×ay'×ZR.

The normalizing unit 10 scales up or scales down the extracted image to a fixed size to create a normalized search image 304. As illustrated in FIG. 5, suppose that in a fixed size, the number of pixels in the lateral direction is XS, and the number of pixels in the vertical direction is YS. In the case where the normalizing unit 10 scales up the image, the normalizing unit 10 performs processing such as interpolation, for example, whereas in the case where the normalizing unit 10 scales down the image, the normalizing unit 10 performs processing such as decimation, for example.

5. Operation

Figure 6:
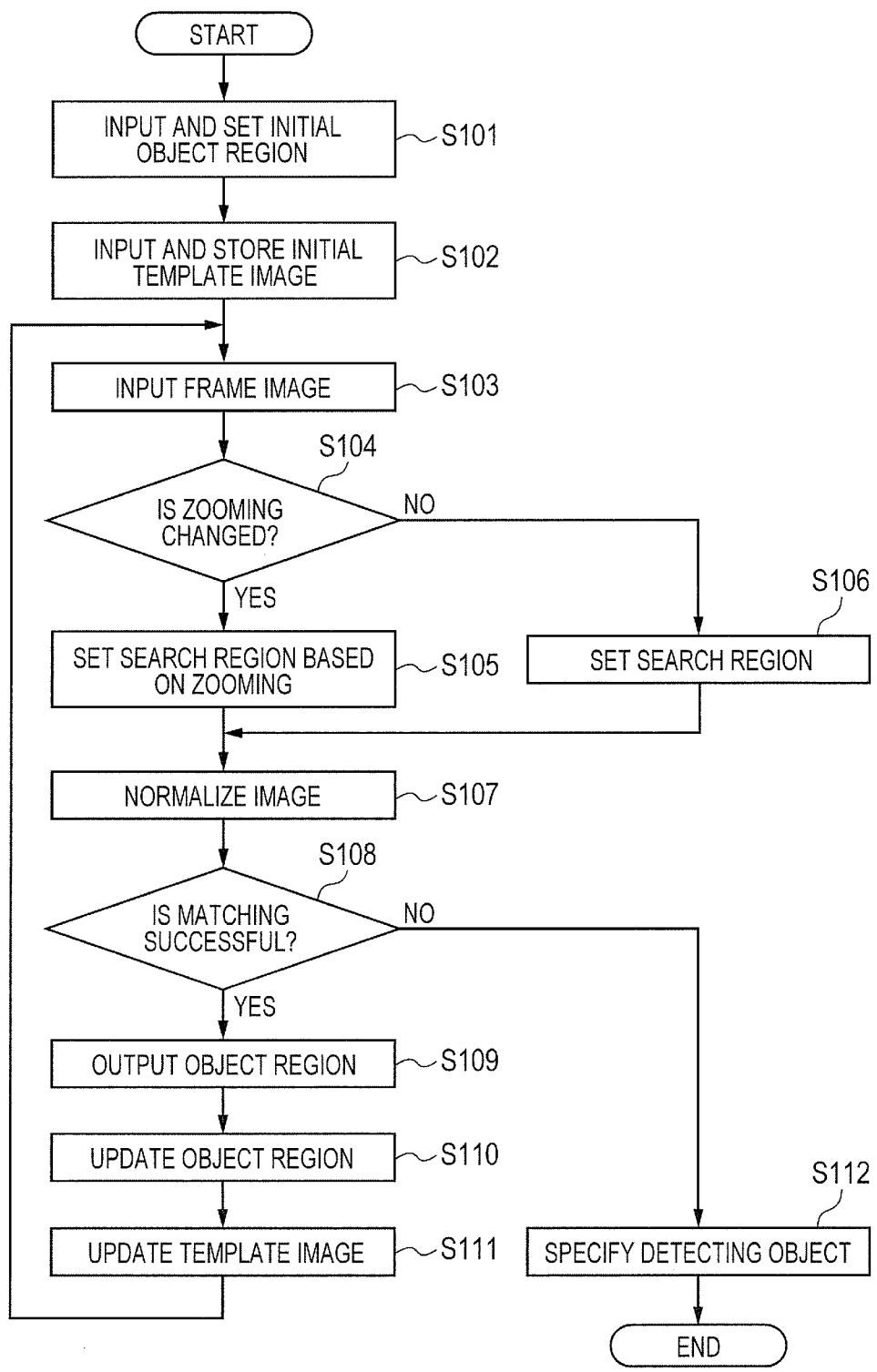
FIG. 6 is a flowchart illustrating the operation procedures of an object tracking process according to the first embodiment.

FIG. 6 is a flowchart illustrating the operation procedures of an object tracking process according to the first embodiment.

Referring to FIG. 6, first, the object region input unit 4 receives information expressing an object region to be a track target from the object detector. The object region setting unit 6 sets the object region outputted from the object detector to an initial object region (Step S101).

Subsequently, the template registration unit 7 stores the image of the target object outputted from the object detector as an initial template in the template storage unit 8 (Step S102).

Subsequently, the image input unit 2 receives a frame image at a present point in time from the camera I/F (Step S103).

Subsequently, in the case where the parameter input unit 3 receives a zoom scaling factor and zoom center coordinates from the CPU 1002 (YES in Step S104), the search region setting unit 9 finds a region (a reference region) including an object region in a frame image at a previous point in time and larger than the object region by a predetermined multiple because the zoom scaling factor of the frame image at the present point in time is different from the zoom scaling factor of the frame image at the previous point in time, and sets a region where the reference region is zoomed (scaled up or scaled down) based on the zoom center coordinates in the frame image at the previous point in time and a ratio between the zoom scaling factor of the frame image at the previous point in time and the zoom scaling factor of the frame image at the present point in time to the search region of the object in the frame image at the present point in time (Step S105).

On the other hand, in the case where the parameter input unit 3 does not receive a zoom scaling factor and zoom center coordinates from the CPU 1002 (NO in Step S104), the search region setting unit 9 sets a reference region including an object region in the frame image at the previous point in time and larger than the object region by a predetermined multiple to an object region in the frame image at the present point in time because the zoom scaling factor of the frame image at the present point in time is the same as the zoom scaling factor of the frame image at the previous point in time (Step S106).

Subsequently, the normalizing unit 10 normalizes the image of the search region of the object in the frame image at the present point in time to a fixed size to create a normalized search image (Step S107).

Subsequently, the matching unit 11 searches the normalized search image for a region similar to the template image stored in the template storage unit 8, and locates a portion where the similarity is a predetermined value or more.

In the case where the matching unit 11 finds a portion where the similarity is a predetermined value or more, that is, in the case where matching is successful (YES in Step S108), the matching unit 11 determines the found portion as the object region in the present frame, and outputs information expressing the region to the CPU 1002 (Step S109).

The object region setting unit 6 sets the object region determined at the matching unit 11 to a new object region (Step S110).

The template registration unit 7 updates the template image in the template storage unit 8 with the image of the object region determined at the matching unit 11 (Step S111).

After that, returning to Step S103, the processes are repeated from the process of inputting the subsequent frame image.

In the case where the matching unit 11 does not find a portion where the similarity is a predetermined value or more, that is, in the case where matching is unsuccessful (NO in Step S108), the matching unit 11 instructs the object detector to again detect the object (Step S112).

6. Effect

As described above, in this embodiment, it is possible to set a search region in consideration of the size of the target object and changes in the position of the target object using the zoom scaling factor and the zoom center coordinates even though the scaling factor of the frame image inputted in the zooming process is changed. Thus, matching with template images is unnecessary.

Moreover, in this embodiment, the image of the search region is scaled down to a normalized image in a certain size for matching with the template, so that it is possible to prevent processing time from being prolonged, which is caused by scaling up the template image for matching as in the related art processes.

Second Embodiment

In tracking a target object, the target object for tracking is sometimes framed out of a frame image caused by scale-up. In the related art techniques, since the target object that is once framed out does not exist in the frame image, location information about the target object is not stored. After that, even in the case where the target object is again framed in the frame image, the object cannot to be tracked because there is no information about the position to be a reference for starting the tracking process (in other words, information about an object detection region in the center of a search region). Therefore, in the related art techniques, in the case where the track target object is framed out, it is inevitable that the tracking process is stopped to again detect the object.

Figure 7:
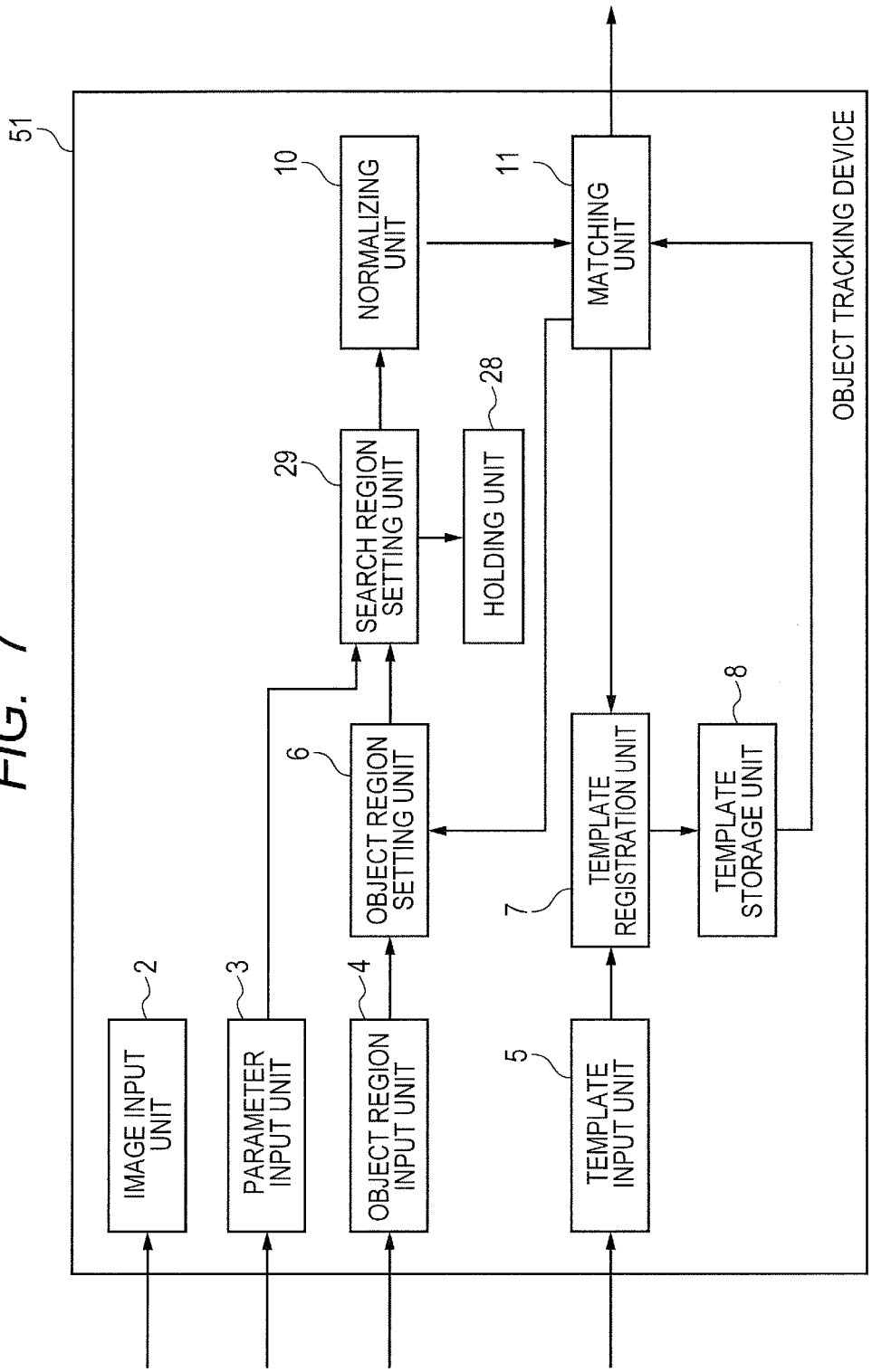
FIG. 7 is a diagram illustrating the configuration of an object tracking device according to a second embodiment.

FIG. 7 is a diagram illustrating the configuration of an object tracking device according to a second embodiment. The following is the point of an object tracking device 51 in FIG. 7 different from the object tracking device 1009 in FIG. 2.

In the case where a part of or the entire search region of an object set at a search region setting unit 29 is not included in a frame image at the present point in time, a holding unit 28 holds the search region of the set object.

Figure 8:
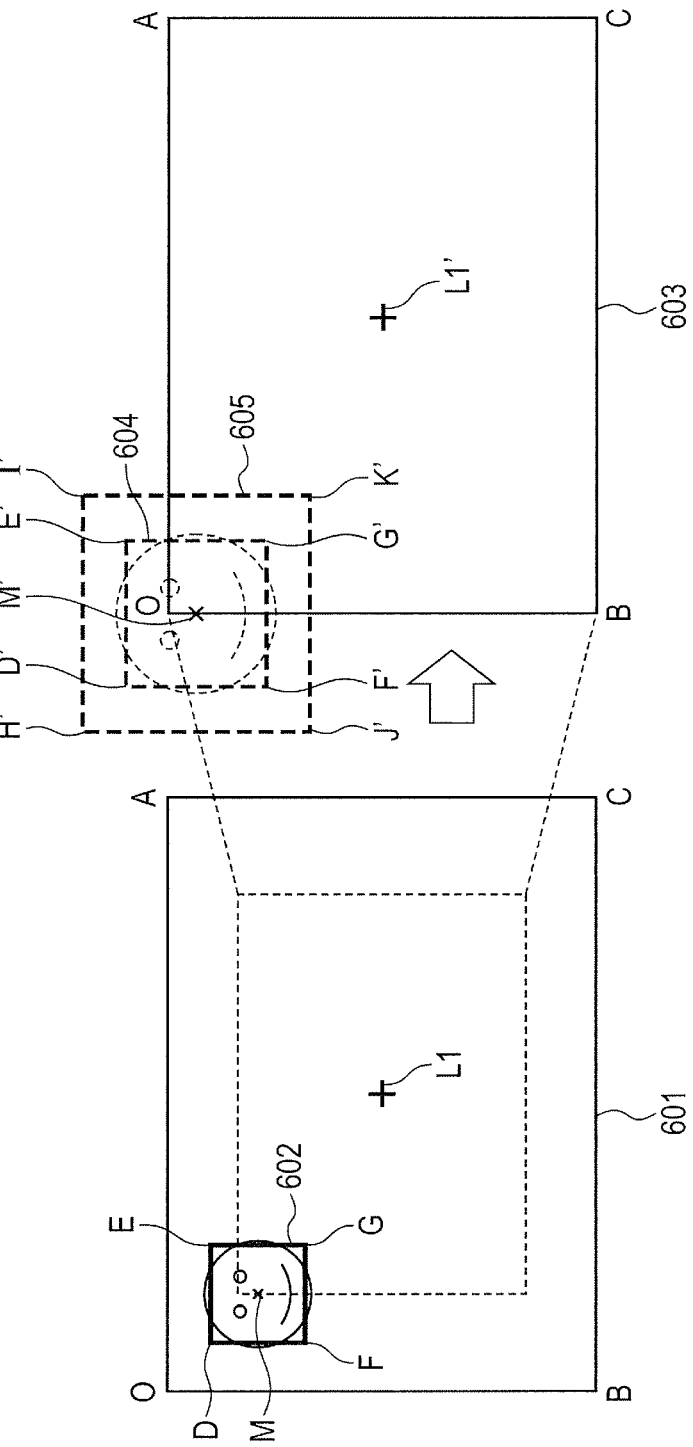
FIG. 8A is a diagram illustrating an ith frame image.
FIG. 8B is a diagram illustrating an (i+1)th frame image.

FIG. 8A is a diagram illustrating an ith frame image. FIG. 8B is a diagram illustrating an (i+1)th frame image.

In an ith frame image 601, suppose that the center zoom is L1, and a scaled up image where the zoom scaling factor ratio is ZR1 is an (i+1)th frame image 603. Here, ZR1>1.

As illustrated in FIG. 8B, in the case where a search region 605 where M' is the center and H', I', J', and K' are vertexes goes out of the frame image 603, the holding unit 28 holds the coordinates of M', H', I', J', and K'. The position of M' is at (XP, YP), the position of H' is at (XP−ax'×ZR1, YP−ay'×ZR1), the position of I' is at (XP+ax'×ZR1, YP−ay'×ZR1), the position of J' is at (XP−ax'×ZR1, YP+ay'×ZR1), and the position of K' is at (XP+ax'×ZR1, YP+ay'×ZR1). Where XP=DX/2+ZR1×(X1−X0) and YP=DY/2+ZR1×(Y1−Y0).

In the case where the zoom scaling factor of a frame image at the present point in time is different from the zoom scaling factor of a frame image at the previous point in time, if the holding unit 28 holds the search region of an object in the frame image at the previous point in time, the search region setting unit 29 sets a region zoomed (scaled up or scaled down) based on the search region of the held object, the zoom center coordinates in the frame image at the previous point in time, and a ratio between the zoom scaling factor of the frame image at the previous point in time and the zoom scaling factor of the frame image at the present point in time to the search region of the object in the frame image at the present point in time.

Figure 9:
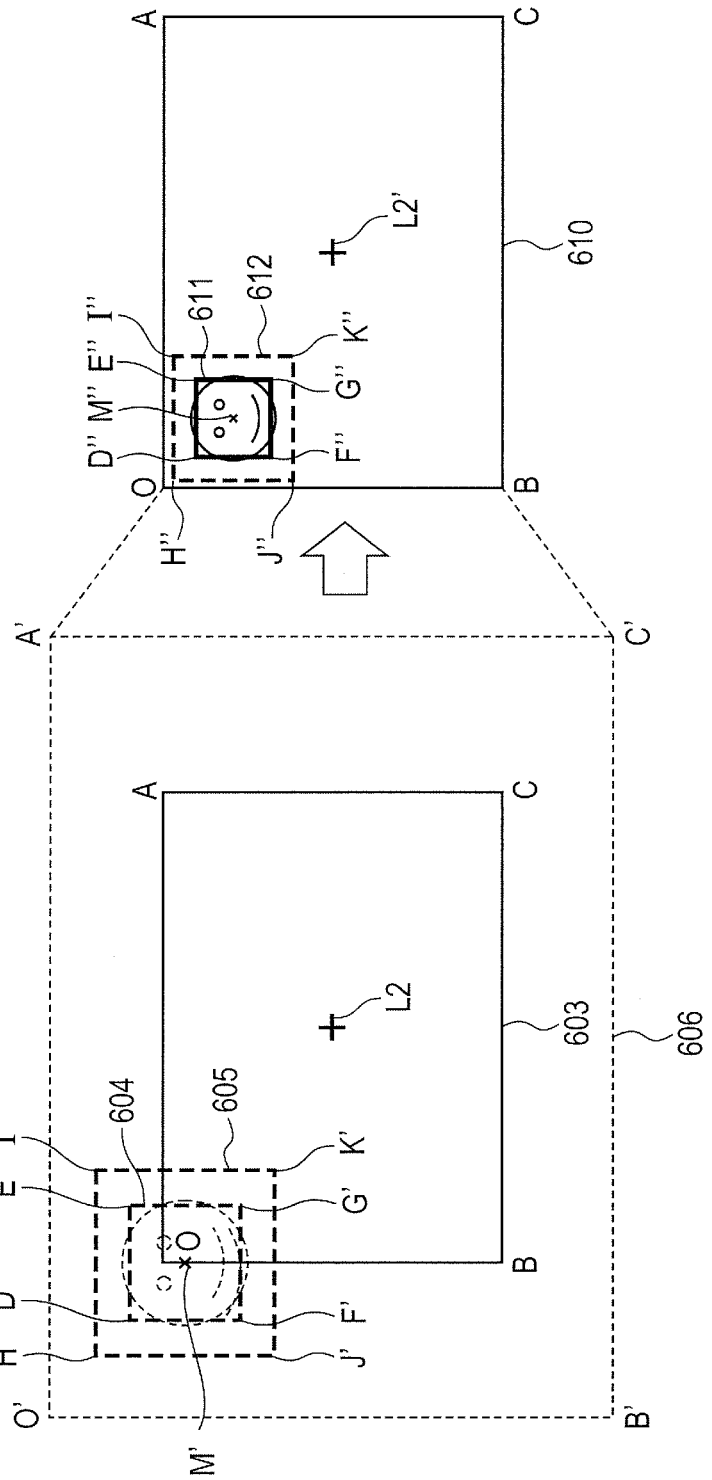
FIG. 9A is a diagram illustrating an (i+1)th frame image.
FIG. 9B is a diagram illustrating an (i+2)th frame image.

FIG. 9A is a diagram illustrating an (i+1)th frame image. FIG. 9B is a diagram illustrating an (i+2)th frame image.

In an (i+1)th frame image 603, suppose that the center zoom is L2 and a scaled down image where the zoom scaling factor ratio is ZR2 is an (i+2)th frame image 610. Here, ZR2<1.

The search region setting unit 29 finds a search region 612 of an object where M" is the center and H", I", J", and K" are vertexes using the positions of M', H', I', J', and K', the zoom center coordinates L2 (X0', Y0'), and the zoom scaling factor ratio ZR2 held at the holding unit 28.

The position of M" is at (XP', YP'), the position of H" is at (XP'−ax'×ZR1×ZR2, YP'−ay'×ZR1×ZR2), the position of I" is at (XP'+ax'×ZR1×ZR2, YP'−ay'×ZR1×ZR2), the position of J" is at (XP'−ax'×ZR1×ZR2, YP'+ay'×ZR1×ZR2), and the position of K" is at (XP'+ax'×ZR1×ZR2, YP'+ay'×ZR1×ZR2). Where XP'=DX/2+ZR2×(XP−X0') and YP'=DY/2+ZR2×(YP−Y0').

1. Operation

Figure 10:
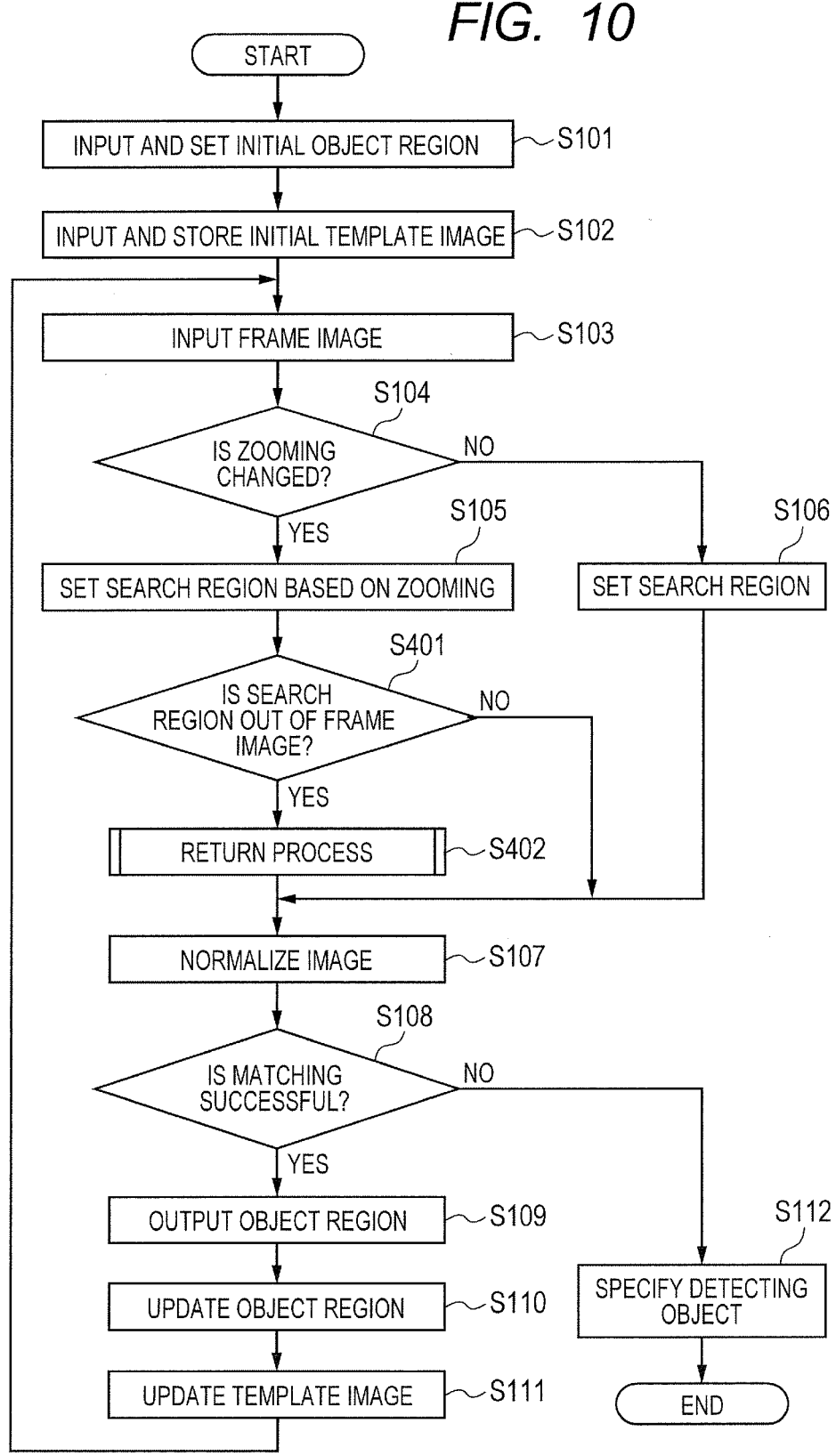
FIG. 10 is a flowchart illustrating the operation procedures of an object tracking process according to the second embodiment.

FIG. 10 is a flowchart illustrating the operation procedures of an object tracking process according to the second embodiment.

Referring to FIG. 10, first, an object region input unit 4 receives information expressing an object region to be a track target from an object detector. An object region setting unit 6 sets the object region outputted from the object detector to an initial object region (Step S101).

Subsequently, a template registration unit 7 stores the image of the target object outputted from the object detector as an initial template in a template storage unit 8 (Step S102).

Subsequently, an image input unit 2 receives a frame image at a present point in time from a camera I/F (Step S103).

Subsequently, in the case where a parameter input unit 3 receives a zoom scaling factor and zoom center coordinates from a CPU 1002 (YES in Step S104), the search region setting unit 29 finds a region (a reference region) including an object region in a frame image at a previous point in time and larger than the object region by a predetermined multiple because the zoom scaling factor of the frame image at the present point in time is different from the zoom scaling factor of the frame image at the previous point in time, and sets a region where the reference region is zoomed (scaled up or scaled down) based on the zoom center coordinates in the frame image at the previous point in time and a ratio between the zoom scaling factor of the frame image at the previous point in time and the zoom scaling factor of the frame image at the present point in time to the search region of an object in the frame image at the present point in time (Step S105).

In the case where a part of or the entire set search region goes out of the frame image at the present point in time (YES in Step S401), a return process, described later, is performed (Step S402).

On the other hand, in the case where the parameter input unit 3 does not receive a zoom scaling factor and zoom center coordinates from the CPU 1002 (NO in Step S104), the search region setting unit 29 sets a reference region including an object region in the frame image at the previous point in time and larger than the object region by a predetermined multiple to the object region in the frame image at the present point in time because the zoom scaling factor of the frame image at the present point in time is the same as the zoom scaling factor of the frame image at the previous point in time (Step S106).

Subsequently, a normalizing unit 10 normalizes the image of the search region of the object in the frame image at the present point in time to a fixed size to create a normalized search image (Step S107).

Subsequently, a matching unit 11 searches the normalized search image for a region similar to the template image stored in the template storage unit 8, and locates a portion where the similarity is a predetermined value or more.

In the case where the matching unit 11 finds a portion where the similarity is a predetermined value or more, that is, in the case where matching is successful (YES in Step S108), the matching unit 11 determines the found portion as the object region in the present frame, and outputs information expressing the region to the CPU 1002 (Step S109).

The object region setting unit 6 sets the object region determined at the matching unit 11 to a new object region (Step S110).

The template registration unit 7 updates the template image in the template storage unit 8 with the image of the object region determined at the matching unit 11 (Step S111).

After that, returning to Step S103, the processes are repeated from the process of inputting the subsequent frame image.

In the case where the matching unit 11 does not find a portion where the similarity is a predetermined value or more, that is, in the case where matching is unsuccessful (NO in Step S108), the matching unit 11 instructs the object detector to again detect the object (Step S112).

2. Return Process

Figure 11:
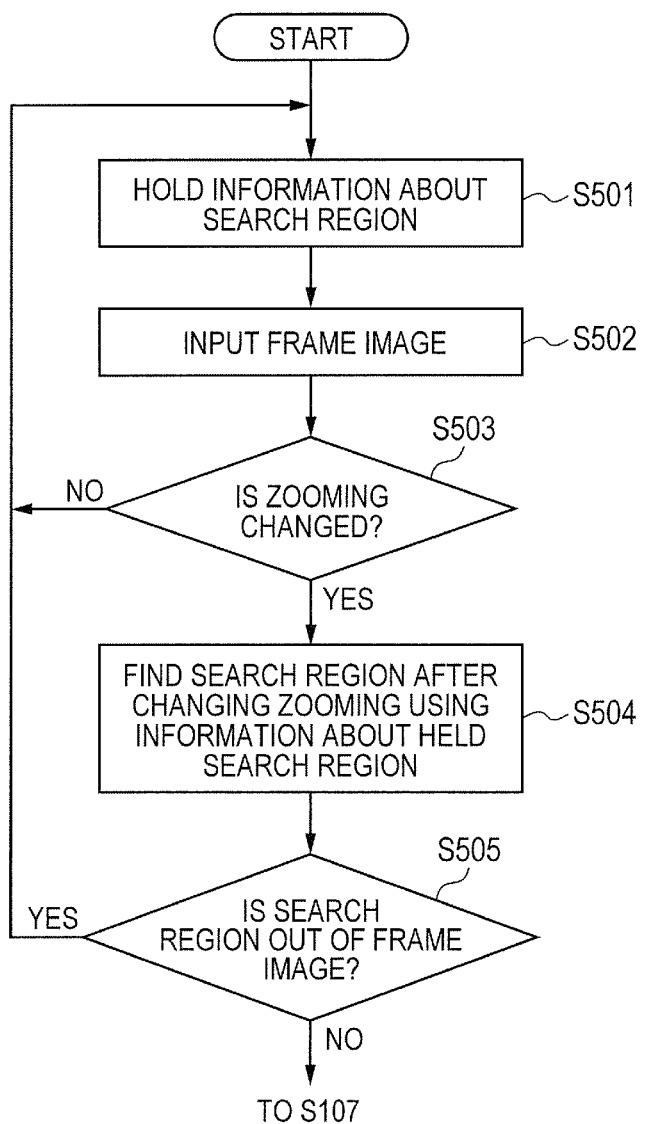
FIG. 11 is a flowchart illustrating the procedures of a return process in Step S402 in FIG. 10.

FIG. 11 is a flowchart illustrating the procedures of the return process in Step S402 in FIG. 10.

First, the holding unit 28 stores information expressing the set search region (Step S501).

The image input unit 2 receives a frame image at the subsequent point in time from the camera I/F (Step S502).

In the case where the parameter input unit 3 receives a zoom scaling factor and zoom center coordinates from the CPU 1002 (YES in Step S503), the search region setting unit 29 sets the zoomed (scaled up or scaled down) region to the search region of the object in the frame image at the present point in time based on the stored object search region in the frame image at the previous point in time, the zoom center coordinates in the frame image at the previous point in time, and a ratio between the zoom scaling factor of the frame image at the previous point in time and the zoom scaling factor of the frame image at the present point in time because the zoom scaling factor of the frame image at the present point in time is different from the zoom scaling factor of the frame image at the previous point in time (Step S504).

In the case where a part of or the entire set search region goes out of the frame image at the present point in time (YES in Step S505), the processes from Step S501 are repeated.

3. Effect

As described above, according to the second embodiment, even though the track target object is framed out of the frame image caused by scale-up, the search region of the framed out object is held and used for setting a search region in the subsequent frame, so that it is possible to continue to track the object.

It is noted that in the case of YES in Step S505 in FIG. 11 in the embodiment, the process always returns to Step S501. However, in the case where the return process in FIG. 11 continues for a predetermined time period or more, or in the case where the loop from Step S501 to S505 continues for a predetermined number of times, such a configuration may be possible in which the return process is ended to cause the object detector to again detect the object.

The embodiments disclosed this time are illustrations in all points and should not be considered in limited ways. The scope of the present invention is described by the appended claims, not by the foregoing description, including all modifications and alterations in the meanings and scopes equivalent to the appended claims.

What is claimed is:

1. An object tracking device that tracks an object included in a frame image, the object tracking device comprising:
    a storage unit configured to store a template image of an object to be a track target;
    an image input unit configured to receive a frame image in a time series;
    a search region setting unit configured to set a search region of the object in a frame image at a present point in time, when a zoom scaling factor of the frame image at the present point in time is different from a zoom scaling factor of a frame image at a previous point in time, based on an object region in the frame image at the previous point in time, zoom center coordinates in the frame image at the previous point in time, and a ratio between the zoom scaling factor of the frame image at the previous point in time and the zoom scaling factor of the frame image at the present point in time;
    a normalizing unit configured to normalize an image of the search region of the object included in the frame image at the present point in time to a fixed size; and
    a matching unit configured to search the normalized image of the search region for an object region similar to the template image.

2. The object tracking device according to claim 1, wherein the search region setting unit sets a region where a reference region including the object region in the frame image at the previous point in time and larger than the object region by a predetermined multiple is zoomed according to the zoom center coordinates and the ratio between the zoom scaling factors to the search region of the object in the frame image at the present point in time.

3. The object tracking device according to claim 1, comprising:
    a holding unit configured to hold the search region of the set object when a part of or the entire search region of the object set at the search region setting unit is not included in the frame image at the present point in time,
    wherein after a point in time elapses, when the zoom scaling factor of the frame image at the present point in time is different from the zoom scaling factor of the frame image at the previous point in time, the search region setting unit uses the search region of the object held at the holding unit to set the search region of the object in the frame image at the present point in time.

4. The object tracking device according to claim 1, further comprising:
    a registration unit configured to store, in the storage unit as the template image, an image of a target object outputted from an object detector that detects a target object from a frame image.

5. The object tracking device according to claim 4, wherein the registration unit updates the template image in the storage unit with an image of the object region at the present point in time searched at the matching unit as the image is similar to the template image.

6. The object tracking device according to claim 1, wherein when a similar region is unable to be searched, the matching unit instructs the object detector to detect the object.

* * * * *